(12) United States Patent
Clara et al.

(10) Patent No.: US 8,700,196 B2
(45) Date of Patent: Apr. 15, 2014

(54) METHOD FOR PROVIDING FINISHING PARAMETERS

(75) Inventors: Philippe Clara, Charenton le Pont (FR); Laurent Cussac, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 367 days.

(21) Appl. No.: 13/062,376

(22) PCT Filed: Sep. 4, 2009

(86) PCT No.: PCT/EP2009/061474
§ 371 (c)(1),
(2), (4) Date: May 23, 2011

(87) PCT Pub. No.: WO2010/026221
PCT Pub. Date: Mar. 11, 2010

(65) Prior Publication Data
US 2012/0130524 A1    May 24, 2012

(30) Foreign Application Priority Data

Sep. 4, 2008  (EP) ..................................... 08305524

(51) Int. Cl.
*G06F 19/00*    (2011.01)
*G02C 5/00*    (2006.01)
*G02C 7/02*    (2006.01)
*G06Q 30/00*    (2012.01)

(52) U.S. Cl.
USPC ................. 700/97; 700/98; 351/41; 351/177; 351/178; 705/26.5

(58) Field of Classification Search
USPC .......... 351/41, 160, 177–178, 200–204, 219, 351/246–247; 705/26.5; 709/217–219; 700/97–108; 451/8, 42
See application file for complete search history.

(56) References Cited

U.S. PATENT DOCUMENTS 5,592,248 A * 1/1997 Norton et al. ................. 351/246
5,926,247 A * 7/1999 Kimura ........................... 351/41

(Continued)

FOREIGN PATENT DOCUMENTS

WO   WO 03/098181     11/2003
WO   WO 2005/092173   10/2005

(Continued)

OTHER PUBLICATIONS

EPO: "Mitteilung des Europäischen Patentamts vom 1. Oct. 2007 über Geschäftsmethoden" = Notice from the European Patent Office dated Oct. 1, 2007 concerning business methods = Communiqué de l'Office européen des brevets, en date du ler Oct. 2007, concernant les méthodes dans le domaine des activités Journal Officiel De L'office Europeen Des Brevets. Officiel Journal of The European Patent Office.Amtsblattt Des Europaeischen Patentamts, OEB, Munchen, DE, vol. 30, No. 11, Nov. 1, 2007, pp. 592-593.

(Continued)

*Primary Examiner* — Ramesh Patel
(74) *Attorney, Agent, or Firm* — Cozen O'Connor

(57) ABSTRACT

A method for providing finishing parameters related to an ophthalmic lens adapted to a spectacle frame in which generic finishing parameters (GFP) are provided (S11) for an ophthalmic lens adapted to a spectacle frame, the generic finishing parameters (GFP) being associated to a first identifier (ID1); a request (REQ1) is received (S12) from a distant entity, indicating an association between the first identifier (ID1) and a second identifier (ID2) assigned to the chosen finishing entity (CFE); specific finishing parameters (SFP) specific to the chosen finishing entity are generated (S13), the specific finishing parameters (SFP) being obtained by associating the generic finishing parameters (GFP) with specific parameters corresponding to the chosen finishing entity (CFE); a second request (REQ2) associated with at least the first identifier (ID1) is received (S14); and, upon receipt of the second request (REQ2), the specific finishing parameters (SFP) are sent (S15) to the chosen finishing entity (CFE).

12 Claims, 3 Drawing Sheets

(56) References Cited

U.S. PATENT DOCUMENTS

| | | | |
|---|---|---|---|
| 5,983,201 A * | 11/1999 | Fay | 705/26.5 |
| 6,095,650 A * | 8/2000 | Gao et al. | 351/227 |
| 6,142,628 A * | 11/2000 | Saigo | 351/204 |
| 6,637,880 B1 * | 10/2003 | Yamakaji et al. | 351/159.75 |
| 6,692,127 B2 * | 2/2004 | Abitbol et al. | 351/227 |
| 7,222,091 B2 * | 5/2007 | Yoshida | 705/26.8 |
| 7,441,895 B2 * | 10/2008 | Akiyama et al. | 351/206 |
| 2002/0105530 A1 * | 8/2002 | Waupotitsch et al. | 345/630 |
| 2003/0123026 A1 * | 7/2003 | Abitbol et al. | 351/204 |
| 2004/0064376 A1 * | 4/2004 | Yoshida | 705/26 |
| 2005/0179863 A1 | 8/2005 | Taguchi | |
| 2007/0118428 A1 * | 5/2007 | Akiyama et al. | 705/26 |
| 2010/0293192 A1 * | 11/2010 | Suy et al. | 707/769 |
| 2010/0293251 A1 * | 11/2010 | Suy et al. | 709/219 |
| 2011/0166834 A1 * | 7/2011 | Clara | 703/1 |
| 2012/0008094 A1 * | 1/2012 | Blum et al. | 351/216 |
| 2012/0022985 A1 | 1/2012 | Yoshida | |

FOREIGN PATENT DOCUMENTS

| | | |
|---|---|---|
| WO | WO 2010/023941 | 3/2010 |
| WO | WO 2010/026221 | 3/2010 |

OTHER PUBLICATIONS

Office Action (dated Jul. 17, 2013) of the Japanese Patent Office in corresponding Japanese Patent Application No. 2011-525562.

* cited by examiner

METHOD FOR PROVIDING FINISHING PARAMETERS

RELATED APPLICATIONS

This is a U.S. National Phase Application under 35 USC 371 of International Application PCT/EP2009/061474 filed on Sep. 4, 2009.

This application claims the priority of European application no. 08305524.4 filed Sep. 4, 2008, the entire content of which is hereby incorporated by reference.

FIELD OF THE INVENTION

The present invention relates to a method, a computer system and its components for providing finishing parameters related to an ophthalmic lens adapted to a spectacle frame.

BACKGROUND OF THE INVENTION

Usually, a person needing to wear spectacles and having thus a prescription filled by an ophthalmologist or by another authorized eye care professional goes to the premise of an optician for choosing the frame of the future spectacles. The future wearer of the spectacles may try several spectacle frames and finally chooses one of the tried frames.

The optician performs measurements on the spectacle frame the wearer has chosen. These measurements are required to finalize the lens order when the lenses are to be delivered edged or with edging parameters.

Usually, after having performed the required measurements, the optician sends an order to a lens provider. The order may comprise the wearer's prescription and the measurements of the chosen spectacle frame. Upon the receipt of the order the lens provider can determine an ophthalmic lens design and manufacturing parameters of an ophthalmic lens corresponding to the revised order. The lens provider may also determine finishing parameters, for example edging parameters, so as to assure that the finished ophthalmic lens is adapted to the chosen spectacle frame.

Usually, the lens provider provides either directly to the optician or to an edger an unfinished manufactured ophthalmic lens and the determined finishing parameters.

Upon reception of the unfinished manufactured ophthalmic lens and the finishing parameters, the edger or optician finishes the ophthalmic lens, for example edges the unfinished ophthalmic lens so as to have the finished ophthalmic lens fitting with the chosen frame, using the provided finishing parameters.

Usually, the edger or optician manually enters the finishing parameter in the finishing entities and/or manually adjusts the finishing tools according to the edging parameters.

Furthermore, when the optician wishes to have a finishing lab execute the finishing steps, the optician forwards the unfinished ophthalmic lens and the finishing parameters to the finishing lab.

Therefore, the finishing steps are very time consuming and there is a great risk of mistakes in the forwarding of the finishing parameters and/or in the adjustments of the finishing tools.

The present invention aims to improve the situation.

SUMMARY OF THE INVENTION

One aspect of the invention relates to a method implemented by computer for providing finishing parameters related to an ophthalmic lens adapted to a spectacle frame, wherein the method comprises the step of providing to the computer generic finishing parameters for the ophthalmic lens adapted to the spectacle frame, the generic finishing parameters being associated with a first identifier, and upon a request from a distant entity indicating the first identifier, the computer are arranged for sending the generic finishing parameters to the distant entity.

Advantageously, such method makes it possible to access from a distant entity, for example the finishing entity or edging entity, to the finishing parameters by simply using the first identifier. Therefore, the edger or the optician does not have to manually enter the finishing parameters and/or forward the finishing parameters.

According to further embodiments which can be considered alone or in combination:

upon a request indicating an association between said first identifier and a second identifier assigned to a chosen finishing entity, the computer are arranged for generating specific finishing parameters specific to the chosen finishing entity, the specific finishing parameters being obtained by associating the generic finishing parameters with specific parameters corresponding to the chosen finishing entity;

the method further comprises the steps of:
  storing in a memory of a server the generic finishing parameters associated to a first identifier,
  sending from a first computer entity to the server a first request associated with the first identifier and a second identifier assigned to a chosen finishing entity,
  sending from a second computer entity to the server a second request associated with at least the first identifier, and the server is arranged, for:
  upon the first request, generating specific finishing parameters by associating the generic finishing parameters with specific parameters corresponding to the chosen finishing entity, identified with the second identifier, and storing the specific finishing parameters in a memory of the server, in correspondence to the first identifier, and
  upon the second request, sending the specific finishing parameters to the chosen finishing entity;

the first and second computer entities are the same;
the chosen finishing entity comprises the first and/or the second computer entity;
the first request and the second request are the same;
the specific finishing parameters are generated by adapting the generic finishing parameters according to positioning data of the finishing tools of the chosen finishing entity.

Another aspect of the present invention relates to a method for ordering an ophthalmic lens adapted to a spectacle frame comprising the steps of:
  sending order data comprising the shape of the spectacle frame and the prescription of the wearer,
  receiving manufactured ophthalmic lens adapted to the wearer's prescription associated with a first identifier,
  receiving upon a request indicating at least said first identifier, finishing parameters for the ophthalmic lens adapted to the spectacle frame.

Another aspect of the present invention relates to computer comprising a processor being adapted for, upon a request, generating specific finishing parameters according to generic finishing parameters and a chosen finishing entity.

Another aspect of the present invention relates to a server comprising:
- a memory for storing:
  - generic finishing parameters associated with the ophthalmic lens and the spectacle frame, in correspondence to a first identifier, and
  - specific finishing parameters according to the generic finishing parameters and to a chosen finishing entity identified with a second identifier, in correspondence to the first identifier,
- and a processor being adapted for,
  - upon the first request, generating specific finishing parameters by adapting the generic finishing parameters to the chosen finishing entity identified with the second identifier, and
  - upon the second request, sending the specific finishing parameters to the chosen finishing entity.

Another aspect of the present invention relates to a software product adapted to be stored in a memory of a processor unit of a server or in a removable memory medium adapted to cooperate with a reader of the processor unit of the server, comprising instructions for implementing the method.

Another aspect of the present invention relates to a computer entity comprising a server for implementing the method according to the invention, said computer entity may be part of the chosen finishing entity.

DETAILED DESCRIPTION OF THE PREFERRED EMBODIMENTS

In the sense of the invention the finishing parameters may comprise edging and/or drilling and/or centering parameters.

In the sense of the invention, the generic finishing parameters relate to finishing parameter adapted to an ophthalmic lens and to a spectacle frame. The specific generic finishing parameters relate to finishing parameters adapted to an ophthalmic lens, a spectacle frame and a specific finishing entity, for example to the type of finishing entity.

In the sense of the invention, a finishing entity may comprise an edging entity and/or a drilling entity and/or a centering entity.

Figure 1:
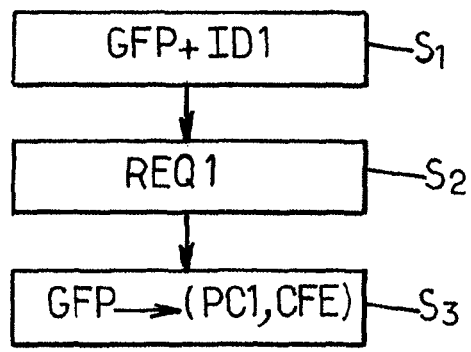
FIG. 1 shows steps of a method according to a first embodiment of the invention.

With reference to FIG. 1, the present invention concerns a method implementing by computer for providing finishing parameters related to an ophthalmic lens adapted to a spectacle frame.

According to an embodiment of the invention, the method comprises:
- a step S1 of providing to computer, generic finishing parameters GFP for a ophthalmic lens adapted to a chosen spectacle frame, generic finishing parameters GFP are associated with a first identifier ID1;
- a step S2 of receiving a request REQ1 from a distant entity (PC1 or CFE) indicating the first identifier ID1; and
- a step S3 of sending the generic finishing parameters GFP to said distant entity (PC1 or CFE).

According to the invention, an optician who has ordered an ophthalmic lens to a lens provider will receive an unfinished ophthalmic lens together with a first identifier ID1. The optician may either decided to finish the ophthalmic lenses himself or have a finishing lab finish the ophthalmic lens.

If the optician decides to finish the ophthalmic lens himself, he may simply send a request REQ1 from his computer or finishing entity, indicating the first identifier ID1 he received with the ophthalmic lens.

According to a method of the invention, the optician receives the generic finishing parameters GFP for the ophthalmic lens adapted to the spectacle frame chosen by the wearer.

The optician may as well forward the unfinished ophthalmic lens he received from the ophthalmic lens provider and the associated first identifier to a finishing lab. The finishing lab may send a request REQ1 associated with said first identifier ID1 so as to receive from the ophthalmic lens provider the generic finishing parameters GFP corresponding to the ophthalmic lenses adapted to the spectacle frame chosen by the wearer.

Figure 2:
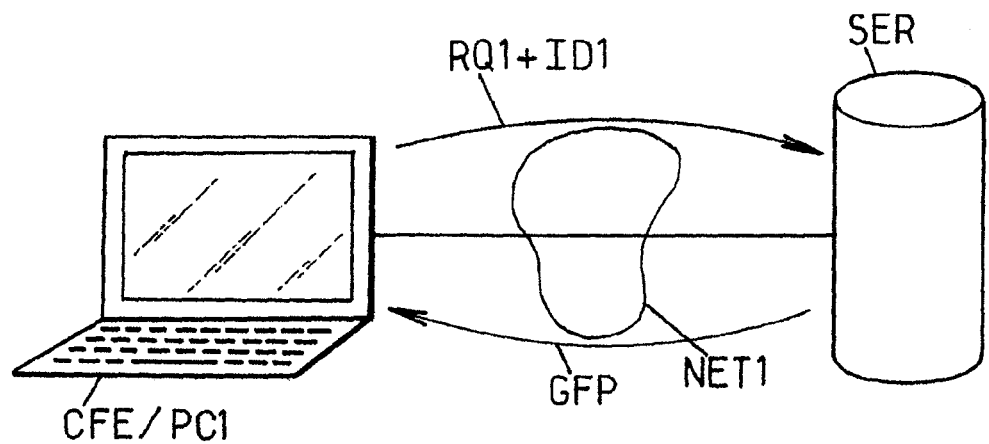
FIG. 2 schematically shows an example of a system for implementing a method according to an embodiment of the invention.

With reference to FIG. 2, a method according to the invention may be implemented by a system as represented in FIG. 2. The system represented in FIG. 2 comprises a distant entity, for example, a chosen finishing entity CFE, linked via a network communication NET, for example via the internet, to a distant server SER.

The chosen finishing entity CFE may comprise a server adapted to send a first request REQ1 indicating a first identifier ID1 to the distant server SER via the network connection NET. The chosen finishing entity CFE also comprises receiving unit adapted to receive from the distant server SER the generic finishing parameters GFP associated with the ophthalmic lenses identified by the first identifier ID1.

Furthermore, the finishing parameters, for example, the edging parameters, may depend on the type of finishing entity used by the edger or the optician. Therefore, when the edger uses the generic edging parameter he needs to adjust the generic parameters to the finishing entity used. Such adaptation is time consuming and may be a source of mistake or of lower accuracy. The present invention may improve the situation.

Figure 3:
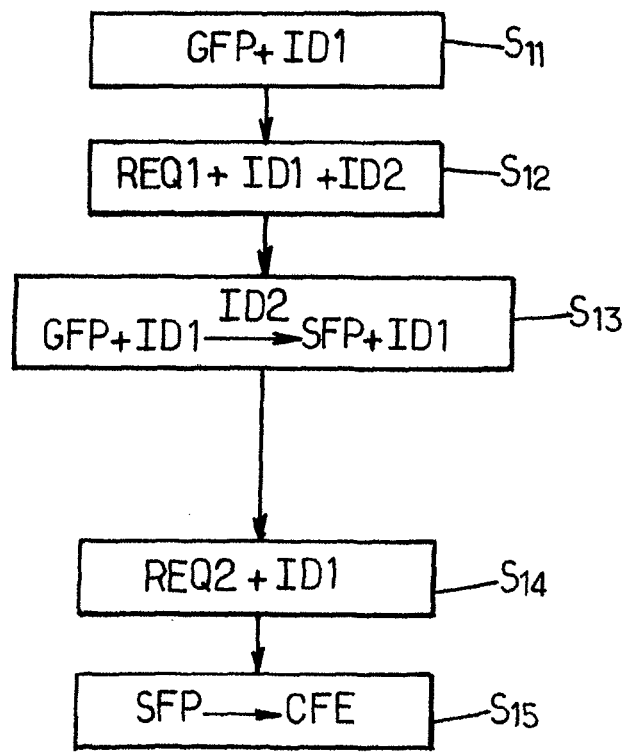
FIG. 3 shows steps of a method according to a second embodiment of the invention.

With reference to FIG. 3, the method for providing finishing parameters related to an ophthalmic lens adapted to a spectacle frame, according to an embodiment of the invention may comprise:
- the step S11 of providing generic finishing parameters GFP for an ophthalmic lens adapted to a spectacle frame, the generic finishing parameters GFP being associated to a first identifier ID1;
- the step S12 of receiving a request REQ1 from a distant entity, for example a distant computer entity PC1 or a distant chosen finishing entity CFE, indicating an association between said first identifier ID1 and a second identifier ID2 assigned to a chosen finishing entity CFE, for example the chosen finishing entity from with the request REQ1 has been sent;
- the step S13 of generating specific finishing parameters SFP specific to the chosen finishing entity, the specific finishing parameters SFP being obtained by associating the generic finishing parameters GFP with specific parameters corresponding to the chosen finishing entity CFE;

the step S14 of receiving a second request REQ2 associated with at least the first identifier ID1; and the step S15 of sending, upon receipt of the second request REQ2, the specific finishing parameters SFP to the chosen finishing entity CFE.

The method according to such an embodiment allows providing specific finishing parameters SFP which are specific to the finishing entity selected either by the optician or by the edger. Advantageously, the accuracy of edging step is increased.

Figure 4:
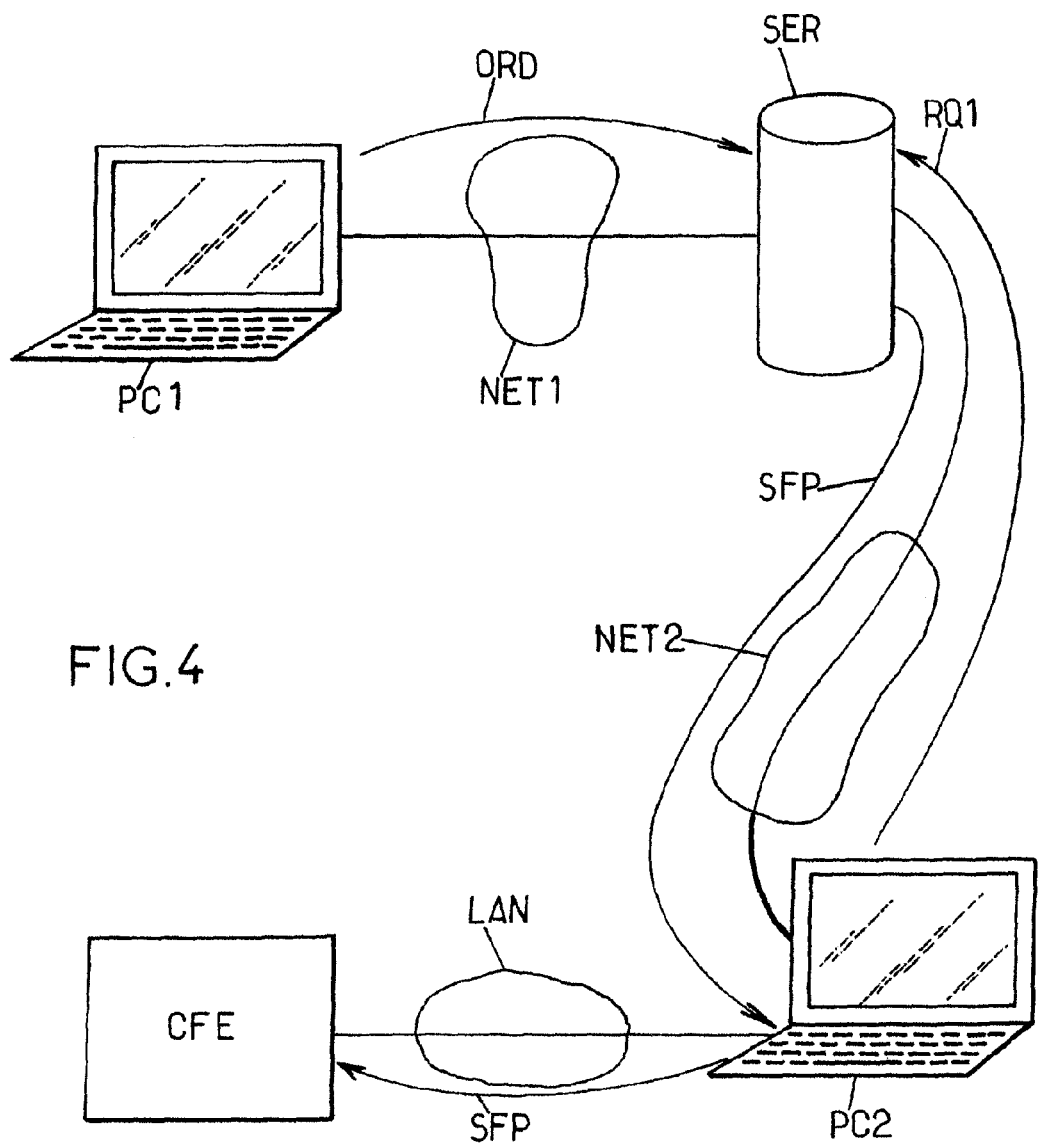
FIG. 4 schematically shows an example of a system for implementing a method according to an embodiment of the invention.

With reference to FIG. 4, a system to implement a method according to an embodiment of the invention may comprise a first computer entity PC1 for example on the optician side.

The first computer entity PC1 may comprise a receiving unit to receive measurements of a chosen spectacle frame, and wearer parameters, for example the wearer prescription.

According to an embodiment, the first computer entity PC1 may comprise a processor adapted to determine according to the wearer prescription and the measurements of the chosen spectacle frame an ophthalmic lens design and generic finishing parameters GFP.

According to another embodiment of the invention, the first computer entity PC1 may be linked via a network connection, for example the Internet or a local area network, to a processor adapted to determine according to the wearer parameters and the measurements of the chosen spectacle frame an ophthalmic lens design and generic finishing parameters GFP.

The optician may send from the first distant computer PC1 an order ORD to a distant server SER. The first computer entity PC1 may be linked to the distant server SER via a first network connection NET1, for example the internet.

The order ORD sent from the first computer entity PC1 may comprise the ophthalmic lens manufacturing parameters and generic finishing parameters.

The server SER may comprise:
a memory for storing:
generic finishing parameters GFP associated with the ophthalmic lens and the spectacle frame, in correspondence to a first identifier ID1, and
specific finishing parameters SFP according to the generic finishing parameters GFP and to a chosen finishing entity CFE identified with a second identifier ID2, in correspondence to the first identifier ID1,
and a processor being adapted for,
upon a first request REQ1 indicating an association between said first and second identifier, generating specific finishing parameters SFP by adapting the generic finishing parameters GFP to the chosen finishing entity CFE identified with the second identifier ID2, and
upon receipt of a second request REQ2, sending the specific finishing parameters SFP to the chosen finishing entity CFE.

The system illustrated on FIG. 4 comprises a second distant computer entity PC2 linked to the server SER via a second network NET2 connection. For example, the second network NET2 can be the same network as the first network NET1, for example the internet. The second distant computer entity PC2 may comprise a sending unit for sending a first request REQ1 indicating an association between a first identifier ID1 and a second identifier ID2 assigned to a chosen finishing entity CFE, to the distant server SER via the second network connection NET2.

The second computer entity PC2 may comprise a receiving unit for receiving specific finishing parameters SFP from the distant server SER via the second network NET2 connection.

The second computer entity PC2 may comprise a sending unit for sending to a chosen finishing entity via a third network connection LAN, for example a local area network, the received specific finishing parameters SFP associated to the ophthalmic lens adapted to the chosen spectacle frame and to the chosen finishing entity CFE.

Figure 5:
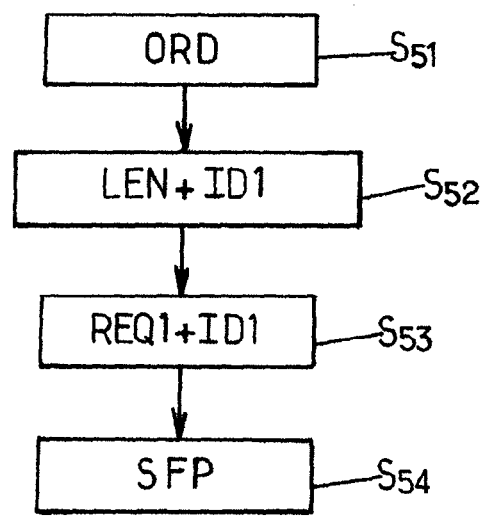
FIG. 5 schematically shows an example of a method of ordering an ophthalmic lens according to an embodiment of the invention.

With reference to FIG. 5, a method for ordering an ophthalmic lens according to an embodiment of the invention may comprise:
a step S51 of sending from a first distant entity PC1 an order ORD comprising at least, the shape of the chosen spectacle frame and the prescription of the wearer;
a step S52 of receiving from a ophthalmic lens provider a unfinished manufactured ophthalmic lens LEN adapted to the wearer prescription and associated with a first identifier ID1;
a step S53 of sending a request REQ1 to a distant server SER, said request REQ1 indicating an association between said first identifier ID1 and a second identifier ID2 assigned to a chosen finishing entity CFE; and
a step S54 of receiving from said distant server SER specific finishing parameters SFP for the unfinished manufactured ophthalmic lenses received in step S52 and adapted to the chosen finishing entity CFE.

The first identifier ID1 may be provided with the unfinished manufactured ophthalmic lens in the form of an identifying code or a bare code.

The second identifier ID2 may be provided in the form of an identifying code or a bare code or from a list of finishing entities.

Advantageously, data which can include in particular the specific finishing parameters SFP can be accessed by the lens provider of course, but also:
by an authorized optician or any other eye care professional (or other third parties such as jobbers of the optician or eye care professional), for making it easier to mount the finished lenses on the provided frame, and/or
by the frame provider in order to know the result of the mounting of the finished lenses on the frame, or in order to provide also adapted accessories accompanying the frame (for example frame screws having a length adapted to the finished lenses to be mounted on the frame).

The access to the data can be provided simply by an electronic mail including the data or through a website page and an identification procedure requiring the entry of a correct identification code.

According to an embodiment of the invention the step 53 of sending a request may be implemented directly from the chosen finishing entity CFE. The second identifier may identify the chosen finishing entity CFE from which the request is sent. Advantageously the risk of mistakes is reduced.

The invention has been described above with the aid of embodiments without limitation of the general inventive concept.

The invention claimed is:

1. A method implemented by a computer, for providing finishing parameters related to an ophthalmic lens adapted to a spectacle frame, wherein the method comprises:
providing generic finishing parameters for an ophthalmic lens adapted to a spectacle frame, the generic finishing parameters being associated to a first identifier;
receiving a first request from a distant entity, indicating an association between said first identifier and a second identifier assigned to a chosen finishing entity;
generating specific finishing parameters specific to the chosen finishing entity, the specific finishing parameters being obtained by associating the generic finishing parameters with specific parameters corresponding to the chosen finishing entity;

receiving a second request associated with at least the first identifier; and sending, upon receipt of the second request, the specific finishing parameters to the chosen finishing entity.

2. The method according to claim 1, wherein the distant entity is a distant computer entity or the chosen finishing entity.

3. The method according to claim 2, wherein the first request and the second request are the same.

4. The method according to claim 1, wherein the specific finishing parameters are generated by adapting the generic finishing parameter according to positioning data of the finishing tools of the chosen finishing entity.

5. Computer means for implementing the method according to claim 4, comprising processing means being adapted for, upon a request, generating specific finishing parameters according to generic finishing parameters and a chosen finishing entity.

6. A server for implementing the method according to claim 4, comprising:
- a memory for storing:
  - generic finishing parameters associated with the ophthalmic lens and the spectacle frame corresponding to a first identifier, and
  - specific finishing parameters according to the generic finishing parameters and to a chosen finishing entity identified with a second identifier corresponding to the first identifier; and
- processing means being adapted for:
  - upon receipt of the first request, generating specific finishing parameters by adapting the generic finishing parameters to the chosen finishing entity identified with the second identifier; and
  - upon receipt of the second request, sending the specific finishing parameters to the chosen finishing entity.

7. A software product adapted to be stored in a memory of a processor unit of a server comprising:
- a memory for storing:
  - generic finishing parameters associated with the ophthalmic lens and the spectacle frame corresponding to a first identifier, and
  - specific finishing parameters according to the generic finishing parameters and to a chosen finishing entity identified with a second identifier corresponding to the first identifier;
- processing means being adapted for:
  - upon receipt of the first request, generating specific finishing parameters by adapting the generic finishing parameters to the chosen finishing entity identified with the second identifier; and
  - upon receipt of the second request, sending the specific finishing parameters to the chosen finishing entity
- or in a removable memory medium adapted to cooperate with a reader of the processor unit of the server, comprising instructions for implementing the method according to claim 4.

8. Computer means for implementing the method according to claim 1, comprising processing means being adapted for, upon a request, generating specific finishing parameters according to generic finishing parameters and a chosen finishing entity.

9. A server for implementing the method according to claim 1, comprising:
- a memory for storing:
  - generic finishing parameters associated with the ophthalmic lens and the spectacle frame corresponding to a first identifier, and
  - specific finishing parameters according to the generic finishing parameters and to a chosen finishing entity identified with a second identifier, corresponding to the first identifier; and
- processing means being adapted for;
  - upon receipt of the first request, generating specific finishing parameters by adapting the generic finishing parameters to the chosen finishing entity identified with the second identifier, and
  - upon receipt of the second request, sending the specific finishing parameters to the chosen finishing entity.

10. A software product adapted to be stored in a memory of a processor unit of a server comprising:
- a memory for storing:
  - generic finishing parameters associated with the ophthalmic lens and the spectacle frame, in correspondence to a first identifier, and
  - specific finishing parameters according to the generic finishing parameters and to a chosen finishing entity identified with a second identifier corresponding to the first identifier; and
- processing means being adapted for:
  - upon receipt of the first request, generating specific finishing parameters by adapting the generic finishing parameters to the chosen finishing entity identified with the second identifier, and
  - upon receipt of the second request, sending the specific finishing parameters to the chosen finishing entity,
- or in a removable memory medium adapted to cooperate with a reader of the processor unit of the server, comprising instructions for implementing the method according to claim 1.

11. The method according to claim 1, wherein the first request and the second request are the same.

12. A method for ordering an ophthalmic lens adapted to a spectacle frame comprising:
- sending from a first distant entity an order comprising at least the shape of the chosen spectacle frame and the prescription of the wearer;
- receiving from an ophthalmic lens provider an unfinished manufactured ophthalmic lens adapted to the wearer prescription and associated with a first identifier;
- sending a request to a distant server, said request indicating an association between said first identifier and a second identifier assigned to a chosen finishing entity; and
- receiving from said distant server specific finishing parameters for the unfinished manufactured ophthalmic lenses received and adapted to the chosen finishing entity.

* * * * *